(12) United States Patent
Seal et al.

(10) Patent No.: US 11,787,649 B2
(45) Date of Patent: Oct. 17, 2023

(54) SYSTEM AND METHOD FOR DETERMINING REAL-TIME ORIENTATION ON CARTS IN AN INDEPENDENT CART SYSTEM

(71) Applicant: Rockwell Automation Technologies, Inc., Mayfield Heights, OH (US)

(72) Inventors: Shankha S. Seal, Westbury, NY (US); Jadav Das, Lake Grove, NY (US); Tracy M. Clark, Boston, MA (US); Michaela R. Kaufmann, Fox Point, WI (US); Dayin Xu, Shanghai (CN); Xikai Sun, Shanghai (CN); John Floresta, Commack, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 106 days.

(21) Appl. No.: 17/224,322

(22) Filed: Apr. 7, 2021

(65) Prior Publication Data
US 2022/0324663 A1    Oct. 13, 2022

(51) Int. Cl.
| | |
|---|---|
| *B65G 67/12* | (2006.01) |
| *B60W 40/11* | (2012.01) |
| *B60W 40/112* | (2012.01) |
| *B60W 40/114* | (2012.01) |

(52) U.S. Cl.
CPC ............. *B65G 67/12* (2013.01); *B60W 40/11* (2013.01); *B60W 40/112* (2013.01); *B60W 40/114* (2013.01); *B60W 2300/40* (2013.01)

(58) Field of Classification Search
CPC ..... B65G 67/12; B60W 40/11; B60W 40/112; B60W 40/114; B60W 2300/40; B66F 9/063; B66F 9/0755; G05D 1/0246; G05D 2201/0216
See application file for complete search history.

(56) References Cited

U.S. PATENT DOCUMENTS

| | | | |
|---|---|---|---|
| 5,125,347 A | 6/1992 | Takahashi et al. | |
| 5,394,807 A | 3/1995 | Sink | |
| 5,497,038 A | 3/1996 | Sink | |
| 6,150,938 A * | 11/2000 | Sower | B66F 9/0755 340/686.2 |

(Continued)

OTHER PUBLICATIONS

Extended European Search Report dated Aug. 30, 2022; Application No. 22165074.0-1205—(8) pages.

*Primary Examiner* — Tyler J Lee
*Assistant Examiner* — Yufeng Zhang
(74) *Attorney, Agent, or Firm* — Boyle Fredrickson, S.C.

(57) ABSTRACT

A system and method of determining orientation of a physical location on a cart or end effector located on the cart in an independent cart system receives a feedback signal from a sensor on the cart. A multi-axis device may generate three or more signals corresponding to X, Y, and Z axes orientations. Processing may be performed on the signals to generate a value of yaw, pitch, or roll of the cart. The feedback or processed signals are transmitted from the mover to a remote device external from the track. The real-time orientation information may be used to implement closed-loop control of an actuator mounted on or external to each cart as the cart travels along the track. Power for the devices on the mover may be provided by a battery mounted on the cart or by a wireless power transfer system.

18 Claims, 13 Drawing Sheets

(56) References Cited

U.S. PATENT DOCUMENTS

| | | | |
|---|---|---|---|
| 6,445,984 B1* | 9/2002 | Kellogg | B62D 15/02 |
| | | | 318/587 |
| 10,164,555 B1 | 12/2018 | Ozimek | |
| 10,587,212 B1 | 3/2020 | Van Dorpe et al. | |
| 10,608,469 B2 | 3/2020 | Floresta et al. | |
| 2003/0217668 A1 | 11/2003 | Fiske et al. | |
| 2019/0286136 A1* | 9/2019 | Nakatsuka | G05D 1/0223 |
| 2020/0017308 A1 | 1/2020 | Huang et al. | |
| 2020/0186063 A1 | 6/2020 | Van Dorpe et al. | |
| 2020/0209867 A1* | 7/2020 | Valois | G01C 21/3848 |
| 2020/0264616 A1* | 8/2020 | Suzuki | G01S 17/89 |
| 2020/0371522 A1 | 11/2020 | Wernersbach | |
| 2021/0099119 A1 | 4/2021 | Sun et al. | |
| 2021/0382476 A1* | 12/2021 | Morrison | G05D 1/0219 |

* cited by examiner

SYSTEM AND METHOD FOR DETERMINING REAL-TIME ORIENTATION ON CARTS IN AN INDEPENDENT CART SYSTEM

BACKGROUND INFORMATION

The subject matter disclosed herein relates to a system and method for determining real-time orientation of a cart or of a device mounted on a cart in an independent cart system. More specifically, a sensor is provided on each cart to determine orientation of the cart for a predefined coordinate system and to transmit the orientation of the cart or of the device mounted on the cart to a controller external to the cart in real-time.

Motion control systems utilizing independent carts and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, also referred to herein as "movers", each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

Numerous differences between different movers or differences in a single mover over time may impact how a mover travels along the track. Variations between movers due, for example, to manufacturing tolerances may result in differences in physical orientation of a location that is intended to be the same location on two different movers. Further, wear in bearings or rollers over time may increase variations between different movers or change orientation of a single mover over time. Wear on the track, such as a dent on a rail, or varying transition distances between track segments may further impact how a mover travels along the track. As still another potential difference, variations in loading on different movers or on the same mover during different runs along the same length of track may cause variations in the orientation of a single mover on different runs or between different movers during a single pass along the same length of track.

In one application of an independent cart system, the track forms a path over which each mover repeatedly travels. At certain positions along the track other actuators may interact with each mover. For example, the mover may be stopped at a loading station at which a first actuator places a product on the mover. The mover may then be driven along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then returns to the loading station to receive another unit of the product, it may be desirable to have the mover travel at different speeds along different segments of the track. For example, as the mover travels past the actuators, the mover may be programmed to travel at a slow speed to facilitate interaction with the actuator, and as the mover travels along a return path, the mover may be programmed to travel at a high speed.

In addition to actuators external to the mover, there may be an actuator or other device mounted to the mover. The mover may include, for example, a clamping device used to secure a product on the mover. Optionally, the mover may include an actuator which moves in one or more axes on the mover. Increasingly complex motion control systems require interaction between either a fixed station or a moving actuator external to the movers and either a fixed or mobile physical location on the mover or on an end effector of an actuator mounted to the mover. These interactions may require precise knowledge of the orientation of a location on the mover or of the end effector on the mover as the mover moves along the track. However, the differences between movers or the differences in a single mover over time may change the orientation of a mover as it passes a particular location along the track.

Thus, it would be desirable to have knowledge of an orientation of a physical location on each mover or of an end effector located on the mover in real-time.

BRIEF DESCRIPTION

According to one embodiment of the invention, a system for real-time determination of orientation for a physical location on a mover in an independent cart system includes a sensor, a control circuit, and a transmitter mounted on the mover. The sensor is configured to generate at least one feedback signal corresponding to a physical orientation of the mover. The control circuit is configured to receive the at least one feedback signal and to generate a data packet including a value corresponding to the physical orientation of the mover. The transmitter is configured to receive the data packet from the control circuit and to transmit the data packet to a receiver located external from the mover.

According to another embodiment of the invention, a method for real-time determination of orientation at a physical location on a mover in an independent cart system includes generating at least one feedback signal corresponding to a physical orientation of the mover with a sensor mounted on the mover, and receiving the at least one feedback signal at a control circuit mounted on the mover. A data packet including a value corresponding to the physical orientation of the mover is generated with the control circuit and is transmitted from the mover with a transmitter mounted on the mover to a receiver mounted external from the mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
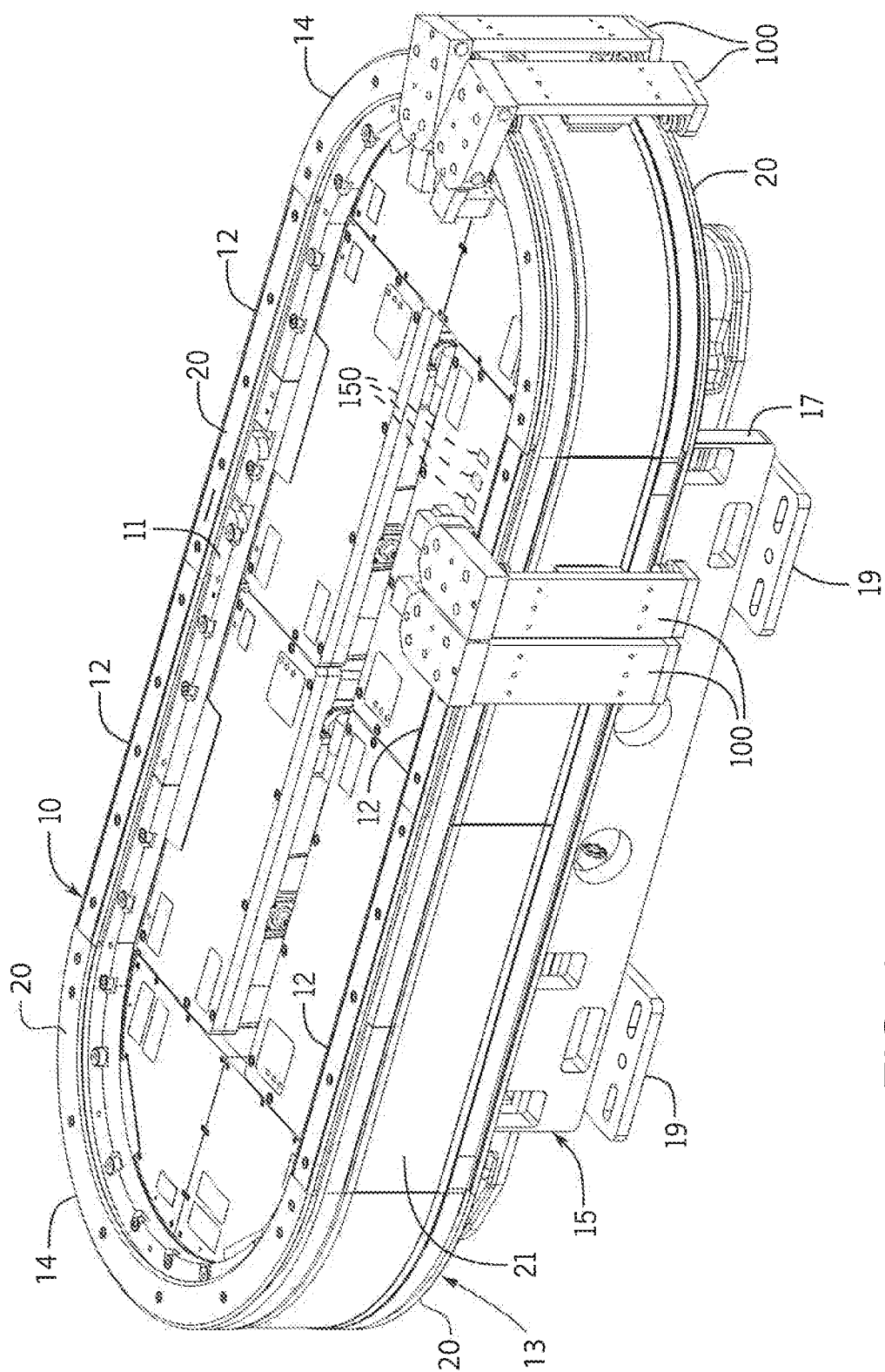
FIG. 1 is a perspective view of an exemplary linear cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method of determining an orientation of a physical location on each cart or of an end effector located on one of the carts for an independent cart system in real-time. One or more sensors are mounted on each cart to generate feedback signals corresponding to orientation of the cart. The sensors may be an accelerometer, gyroscope, compass, or the like. Preferably, a multi-axis integrated circuit (IC) device provides a single package in which multiple sensors are mounted. A three-axis device may generate feedback signals in an X-axis, a Y-axis, and a Z-axis defined with respect to an origin located at a desired position on or with respect to the cart. A six-axis device may generate feedback signals from two or three different types of sensors in each of the X, Y, and Z-axes. The nine-axis device may, for example, generate X, Y, and Z-axis feedback signals for a multi-axis accelerometer, multi-axis gyroscope, and a multi-axis compass with all of the sensors mounted within a single IC device. Additionally, the IC device may be configured to perform additional processing on the feedback signals. The IC device may determine for example, a roll, a pitch, or a yaw, of the cart or an end effector located on the cart as a function of the 3 axis feedback signals from one or from multiple types of sensors.

Each IC device is configured to transmit the feedback signals, the additional processed signals, or a combination thereof to a remote device. Each cart on which the IC device is mounted travels along the track. The remote device is preferably a stationary device mounted external from the track and may, for example, provide a visual interface for a user on which the real-time orientation of each cart or end effector is displayed. On a smaller track, a communication bus may be mounted around the track and each cart may include a brush, configured to slide along the communication bus and to establish a "wired" communication path between the cart and the remote device. However, with branches and/or an increased size in the track, a wired communication path becomes impractical and a wireless communication path is preferred. Each cart may include a wireless communication device in communication with the sensor IC device and with the remote device to transfer data directly from the IC device to the remote device. Optionally, intermediate communication nodes may be established periodically along the track allowing a wireless communication device on each cart communicate to one of the nodes. Each node may, in turn, be connected via a wired connection, a wireless connection, or a combination thereof to the remote device. Each node may serve as a gateway to transfer data between the carts and the remote device.

The real-time orientation information may be used to implement closed-loop control of an actuator mounted on or external to each cart as the cart travels along the track. Some variation in orientation due, for example to vibration or wear on bearings or rollers may occur as a cart or as different carts travel along the track. Interaction between devices mounted on the cart and external to the cart may vary for a single cart on different passes or between two carts traveling one after the other. Having real-time orientation information allows a controller mounted on the cart to adjust a position of an end effector mounted to the cart. Similarly, real-time orientation information transmitted to the remote device may be used to adapt control of an actuator external to the cart, allowing more accurate positioning between the cart and a device external to the cart.

In one embodiment of the invention, it is contemplated that power for the multi-axis IC device and for the wireless communication is provided by a battery mounted on the cart. According to another embodiment of the invention, it is contemplated that power for the multi-axis IC device and for the wireless communication is provided via a wireless power transfer system. The wireless power transfer system may use, for example, inductive or optical coupling between a power source mounted on or adjacent to the track, where the power source is configured to emit energy to a pickup device mounted on the cart. The pickup device is configured to receive the emitted energy when it is range of the power source. Multiple power sources may be stationed around the track or, optionally, a power rail may be mounted continuously along the track and a power pick-up may be inductively coupled to the power rail to continuously receive power on the cart from the wireless power transfer system. The cart may have an energy storage device in which energy transferred to the cart is stored until an actuator, sensor, wireless communication device, or other powered device requires energy for activation.

Figure 2:
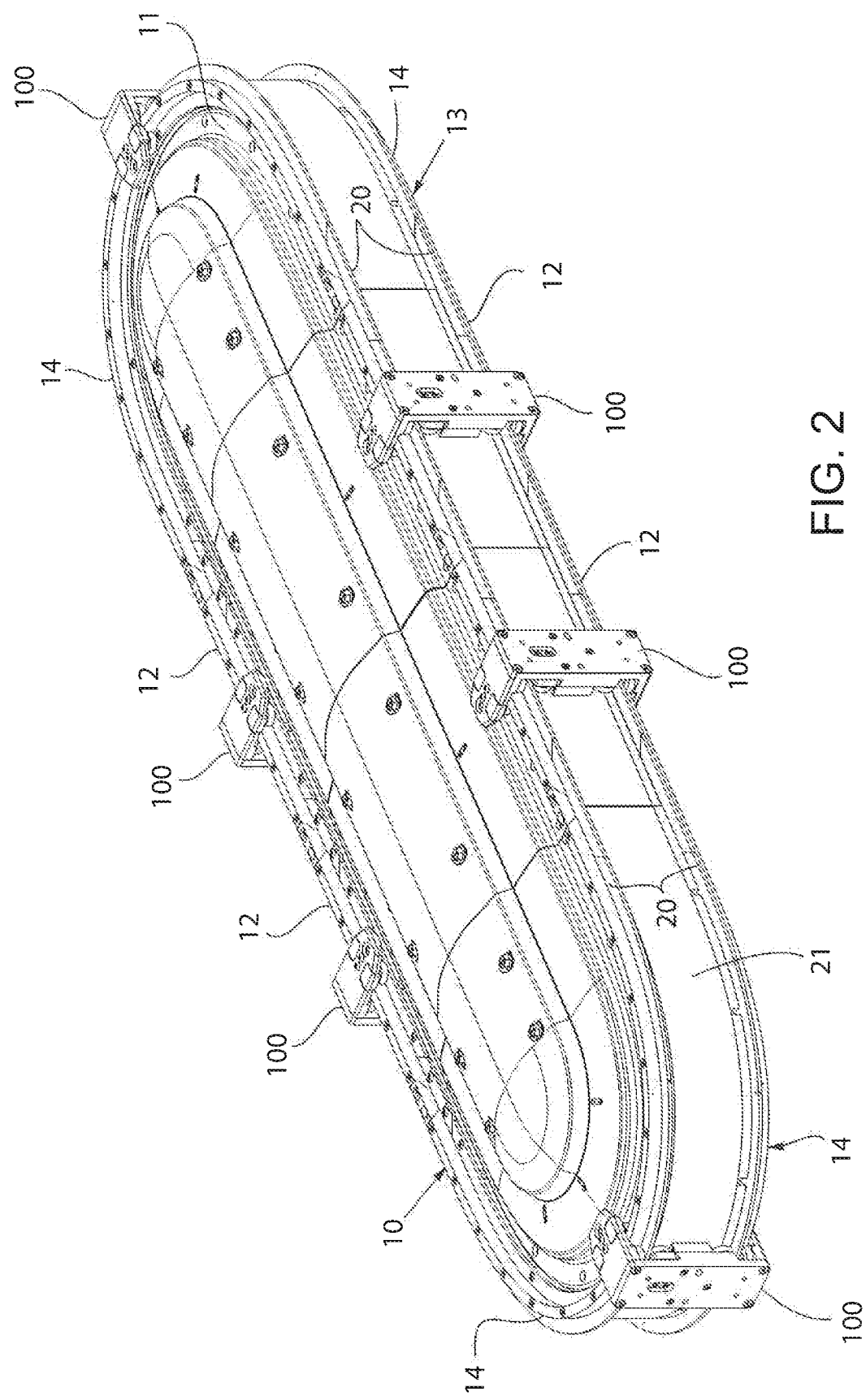
FIG. 2 is a perspective view of an exemplary linear cart system incorporating multiple movers travelling along a closed curvilinear track according to another embodiment of the present invention.
Figure 3:
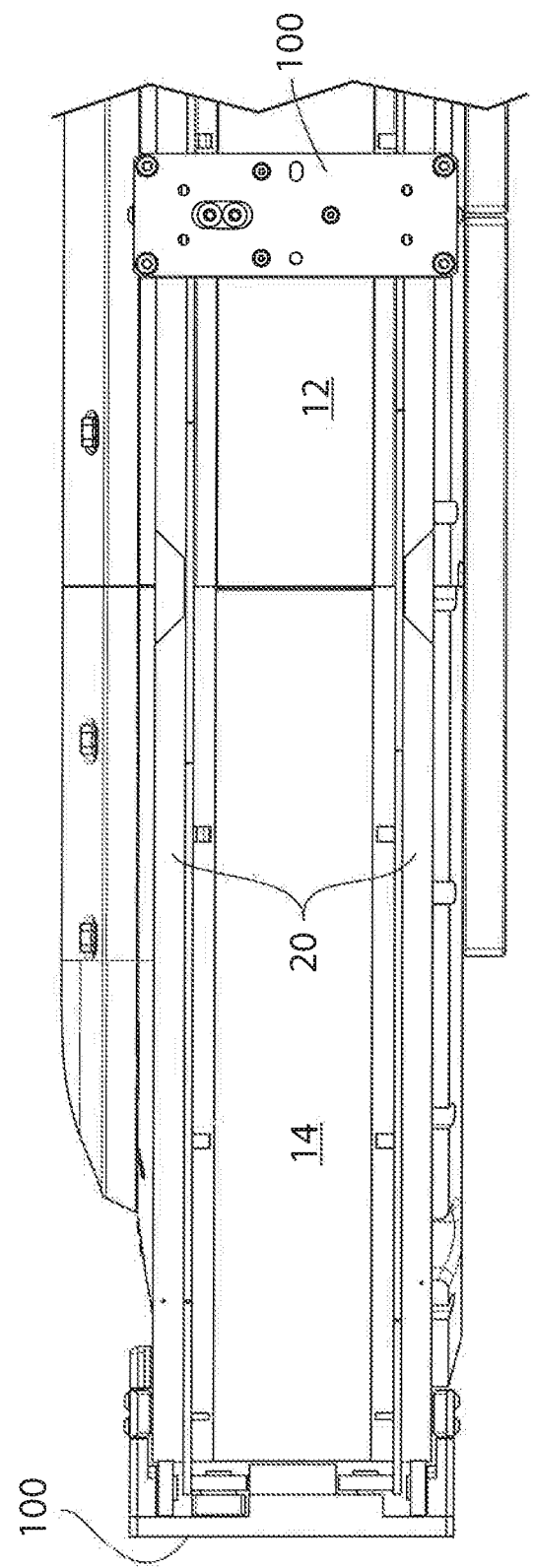
FIG. 3 is a partial side elevation of the linear cart system of FIG. 2.
Figure 4:
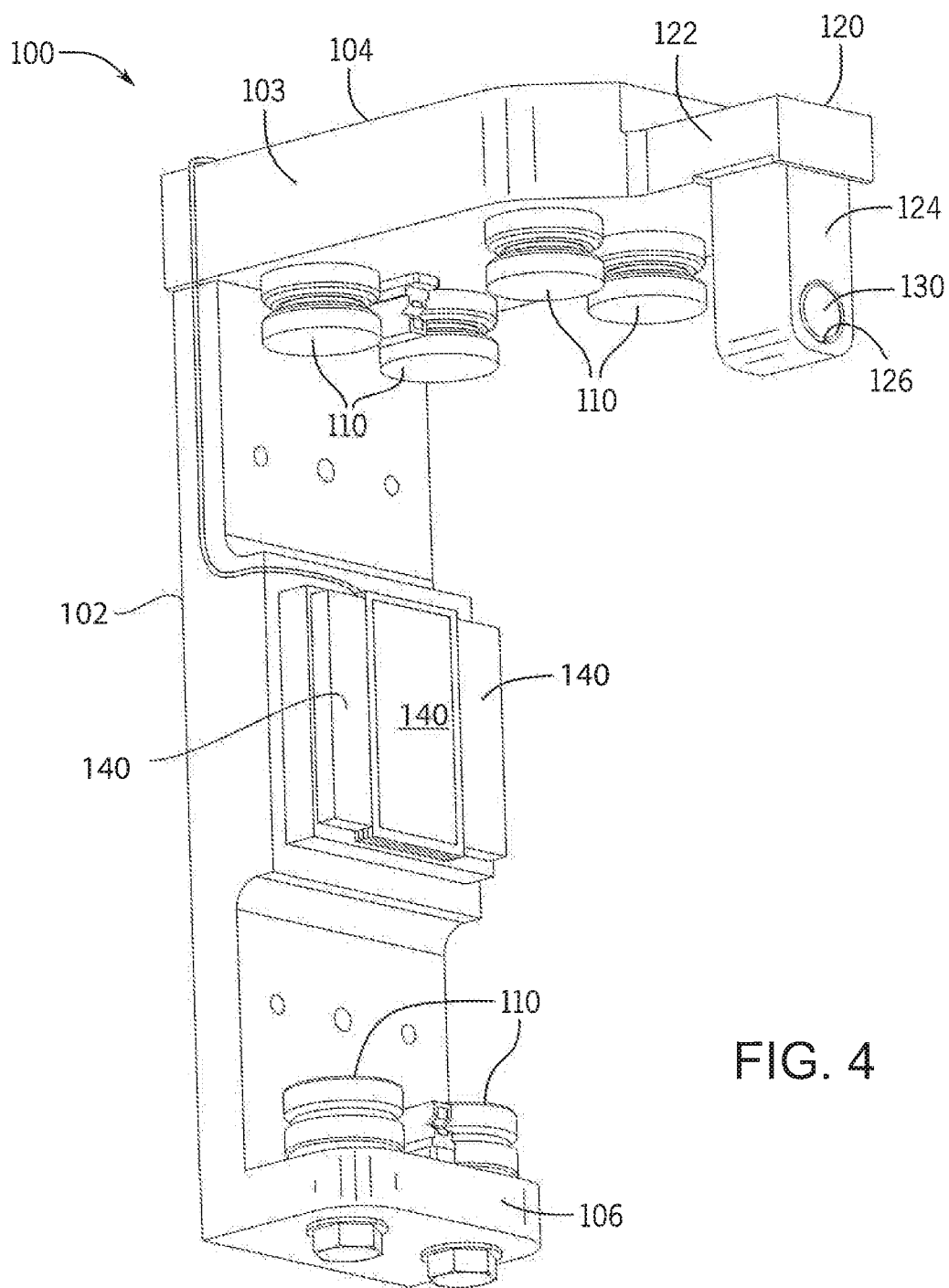
FIG. 4 is a perspective view of a mover from the transport system of FIG. 1.

Turning initially to FIGS. 1-3, two embodiments of an exemplary transport system for moving articles or products are illustrated. The transport system includes a track 10 made up of multiple segments 12, 14. According to the illustrated embodiments, the segments define a generally closed loop supporting a set of movers 100 movable along the track 10. The illustrated tracks 10 each include four straight segments 12 with two straight segments 12 located along each side of the track and spaced apart from the other pair. The tracks 10 also include four curved segments 14 where a pair of curved segments 14 is located at each end of the track 10 to connect the pairs of straight segments 12. The four straight segments 12 and the four curved segments 14 form a generally oval track and define a closed path over which each of the movers 100 may travel. It is understood that track segments of various sizes, lengths, and shapes may be connected together to form a track 10 without deviating from the scope of the invention.

In FIG. 1, the track 10 is oriented in a horizontal plane and supported above the ground by a base 15 extending vertically downward from the track 10. The base 15 includes a pair of generally planar support plates 17, located on opposite sides of the track 10, with mounting feet 19 on each support plate 17 to secure the track 10 to a surface. In FIG. 2, the track 10 is shown without a base. It is contemplated that the tracks 10 may be installed in different orientations, such as sloped or vertical, and include different shaped segments including, but not limited to, straight segments, inward bends, outward bends, up slopes, down slopes and various combinations thereof. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiments, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the dimensions of the track 10 and span only a partial width of the surface of the track 10 on which it is attached.

Figure 5:
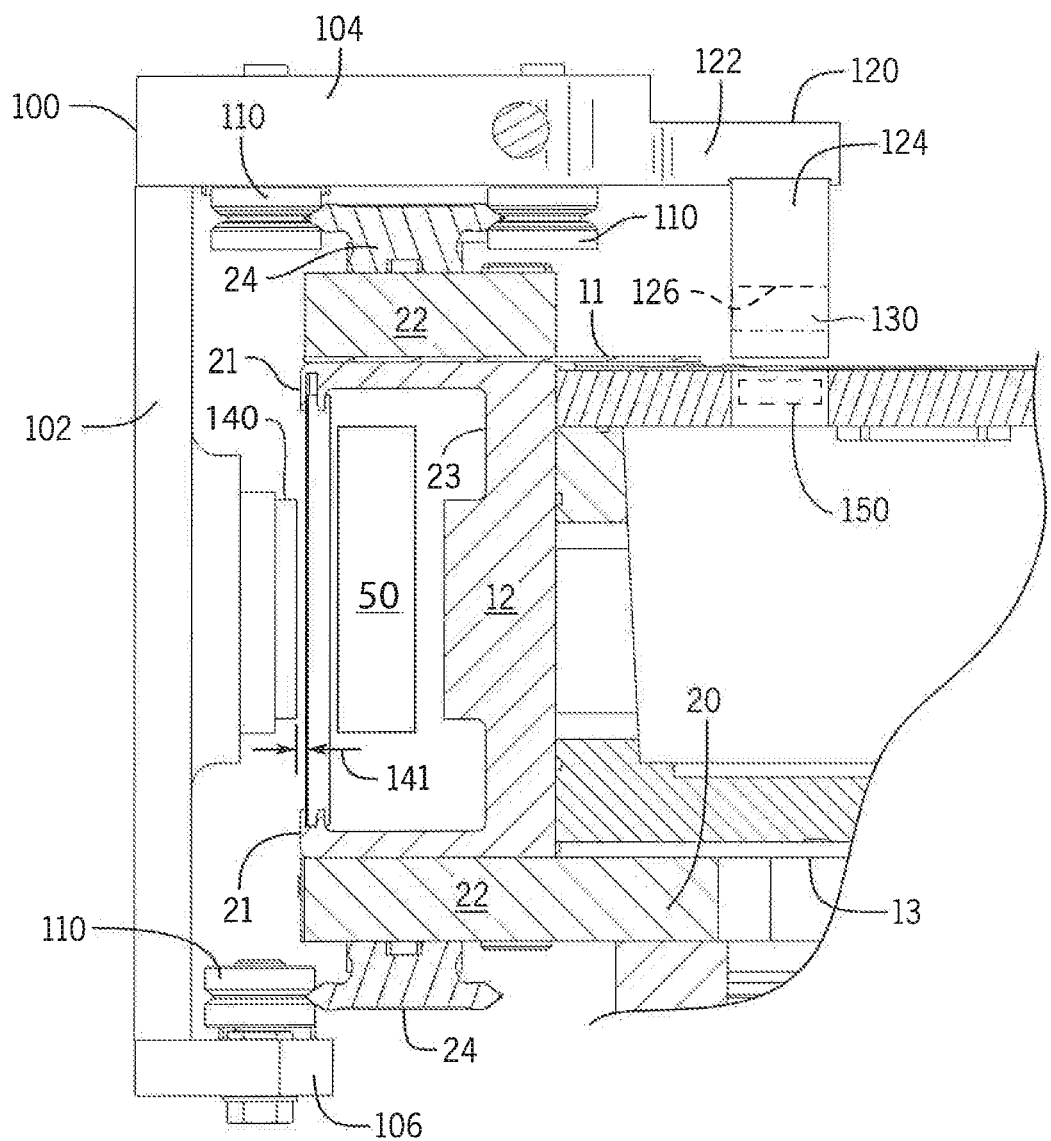
FIG. 5 is a partial sectional view of the transport system of FIG. 1.
Figure 6:
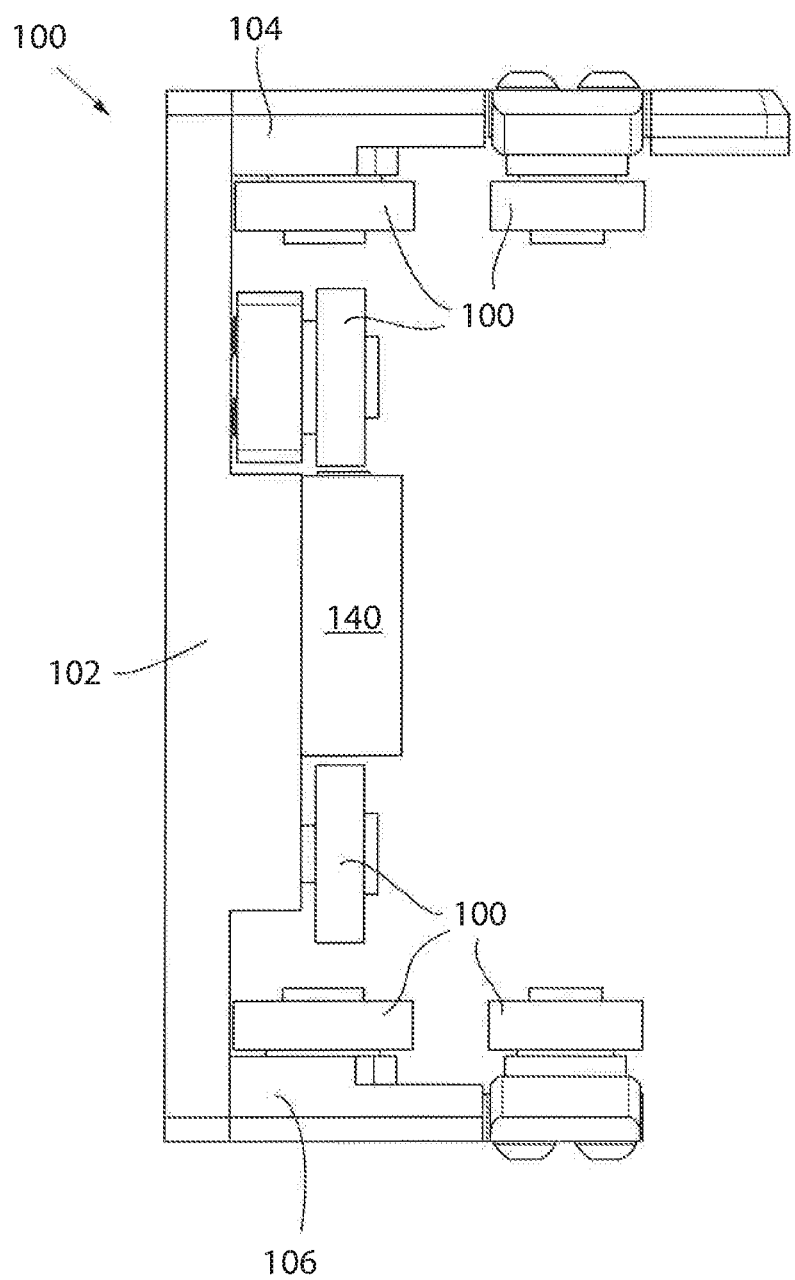
FIG. 6 is a side elevational view of a mover from the transport system of FIG. 2.

With reference also to FIG. 5, a first embodiment of the rail 20 includes a base portion 22 mounted to the track segment and a track portion 24 along which the mover 100 runs. Each mover 100 includes complementary rollers 110 to engage the track portion 24 of the rail 20 for movement along the track 10. Each side of the track portion 24 is wedge-shaped and each roller 110 includes a complementary groove configured to receive the wedge-shaped side of the track portion.

Figure 7:
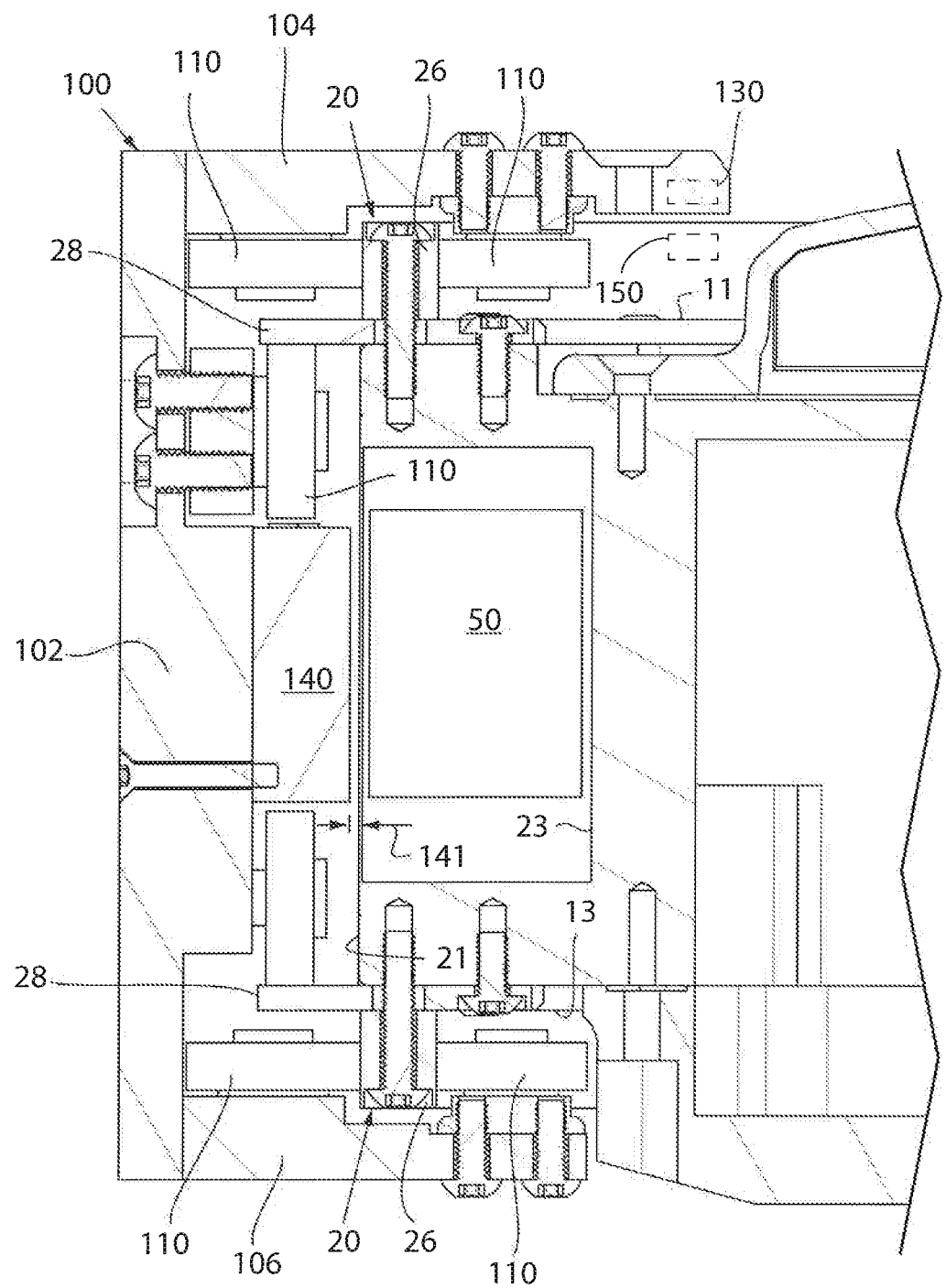
FIG. 7 is a partial sectional view of the transport system of FIG. 2.

With reference also to FIG. 7, a second embodiment of the rail 20 includes two track portions 26, 28, where a first track portion 26 is generally u-draped and a second track portion 28 is generally rectangular. The first track portion 26 of the upper rail 20 is positioned as an inverted "u" on the top surface 11 of the track and first and second rollers 110 engage each side of the first track portion 26 of the upper rail. The second track portion 28 of the upper rail 20 protrudes from the side of the track segment orthogonally to the orientation of the first track portion 26. A third roller 110 engages one surface of the second track portion 28 of the upper rail. The first track portion 26 of a lower rail 20 is oriented as a non-inverted "u" on the lower surface 13 of the track and fourth and fifth rollers 110 engage each side of the first track portion 26 of the lower rail. The second track portion 28 of the lower rail 20 protrudes from the side of the track segment orthogonally to the orientation of the first track portion 26, and a sixth roller 110 engages one surface of the second track portion 28 of the lower rail.

One or more movers 100 are mounted to and movable along the rails 20 on the track 10. With reference again to FIG. 5, a first embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

With reference again to FIG. 7, a second embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. A first set of rollers 110 are mounted on the lower side of the top member 104 and are configured to engage either side of the first track portion 26 of the rail 20 mounted to the upper surface 11 of the track segment. According to the illustrated embodiment two pairs of rollers 110 are mounted to the lower side of the top member 104 with a first pair located along a first side of the first track portion 26 and a second pair located along a second side of the first track portion 26 of the upper rail 20. A third pair of rollers 110 are mounted on the side member 102 and extend below the second track portion 28 of the upper rail. The bottom member 106 extends generally orthogonal to the side member 102 at a bottom end of the side member 102 and extends for a distance sufficient to receive a fourth and fifth pair of rollers 110 along the bottom of the mover 100. The fourth and fifth pair of rollers 110 each engage one side of the first track portion 26 of the lower rail 20. A sixth pair of rollers 110 are mounted on the side member 102 and extend above the second track portion 28 of the lower rail. The rollers 110 act together to engage the various surfaces of the rails 20 to both allow the mover 100 to travel along the rails 20 and to maintain the orientation of the mover 100 with respect to the track 10. According to the illustrated embodiment, a position magnet 130 is mounted within the top member 104 and is configured to align with a sensor 150 mounted within the top surface 11 of the track segment.

With reference to both FIGS. 5 and 7, a linear drive system is incorporated in part on each mover 100 and in part within each track segment 12, 14 to control motion of each mover 100 along the segment. Coils 50 (see also FIG. 8) mounted along the length of the track 10 serve as first drive members. Each mover 100 includes a second drive member 140 which is configured to interact with electromagnetic fields generated by the coils 50 to propel the mover 100 along the track 10. It is contemplated that the drive members 140 on each mover 100 may be drive magnets, steel back iron and teeth, conductors, or any other suitable member that will interact with the electromagnetic fields generated by the coils 50. Commonly, the drive member 140 on each mover 100 includes permanent magnets which emit a magnetic field. The magnetic field generated by the drive member 140 on each mover 100 improves the mover interaction with the electromagnetic field generated by the coils 50 in comparison to a magnetically salient structure that has no magnetic field. For convenience, the invention will be discussed with respect to drive magnets 140 being used as the drive member within each mover 100. However, it is understood that the other magnetically salient structures may be employed without deviating from the scope of the invention.

Figure 8:
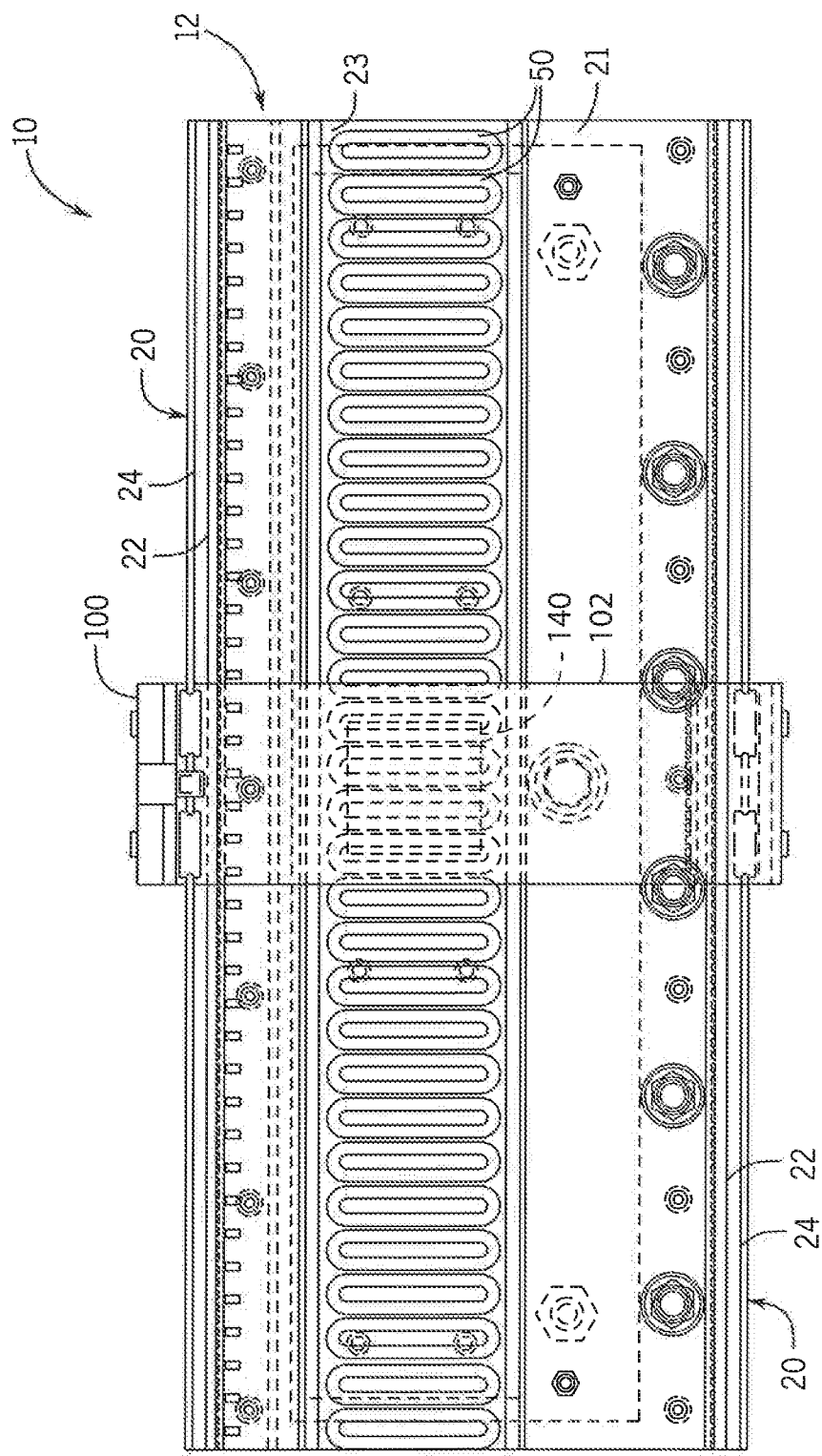
FIG. 8 is a partial side elevation view of one segment of one embodiment of the linear cart system of FIG. 1 illustrating activation coils distributed along one surface of the track segment.

With reference to FIG. 8, a series of coils 50 are positioned along the length of the track 10. Each mover 100 includes at least one drive magnet 140 configured to interact with an electromagnetic field generated in the coils. Successive activation of the coils 50 establishes a moving electromagnetic field that interacts with the magnetic field generated by each permanent magnet 140 mounted on the movers 100 and that causes the mover 100 to travel along the track 10. Controlled voltages are applied to each coil 50 to achieve desired operation of the movers. The drive magnets 140 are mounted on the inner surface of the side member 102 and when mounted to the track 10 are spaced apart from a series of coils 50 extending along the track 10. As shown in FIGS. 5 and 7, an air gap 141 is provided between each set of drive magnets 140 and the coils 50 along the track 10. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 9:
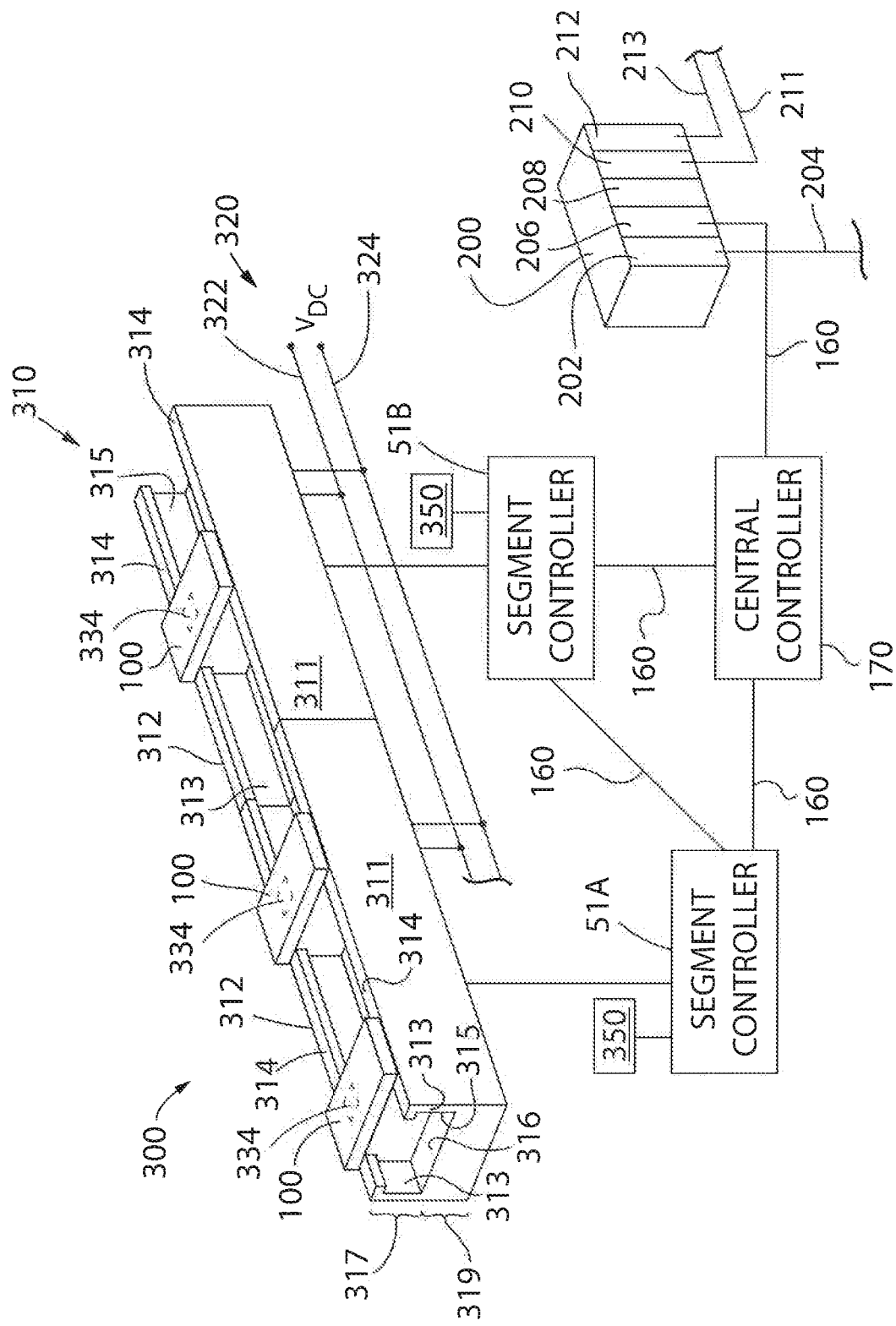
FIG. 9 is an exemplary control system for a linear cart system incorporating one embodiment of the present invention.

Turning next to FIG. 9, a portion of another exemplary independent cart transport system for moving articles or products is illustrated. The illustrated system includes a track 310 made up of multiple segments 312. Rather than traveling along the sides of the track, as shown in FIG. 1, the illustrated movers 100 travel along a channel in the track 310. The channel is defined by a bottom surface 316 and a pair of opposing side walls 313. Rails 314 are placed along the length of the upper surface of each side wall 313 and are configured to support and engage the mover 100 as it travels along the track 310. Power is delivered to segments 312 via a DC bus 320 extending along the track 310. The DC bus 320 includes a positive rail 322 and a negative rail 324 where any suitable voltage potential is provided between the positive and negative rails to energize the coils 50.

The portion of the system illustrated in FIG. 9 includes two straight segments 312 and further illustrates an exemplary control system connected to the independent cart transport system. A segment controller 51 is provided within each track segment 312 to regulate current flow to the coils 50 forming the portion of the linear drive system in each track segment 312. Optionally, each segment controller 51 may also be responsible for all, or a portion of, the motion control of each mover 100 as it travels along the corresponding segment 312. According to one embodiment of the invention, the segment controllers 51 may be mounted together in a control cabinet. A cable, multiple cables, separate conductors, or a combination thereof extend from the control cabinet to each segment 12, 14 to deliver current to the coils 50 and to receive feedback signals, for example, from position sensors 150. In smaller systems, each segment controller 51 and an industrial controller 200 may be included in a single control cabinet. Depending on the size and layout of the track 10, additional control cabinets may be distributed around the track and a portion of the segment controllers 51 located in a control cabinet proximate the track segment 12, 14 they control. Separate control cabinets and controllers within a cabinet are communicatively connected via the network medium 160. Although illustrated as blocks in FIG. 9 external to the track segments 312, the illustration is to facilitate illustration of interconnects between controllers. According to still another embodiment, it is contemplated that each segment controller 51 may be mounted in the lower portion 319 of the track segment 312. Each segment controller 51 is in communication with an adjacent segment controller 51 and a central controller 170 which is, in turn, in communication with an industrial controller 200. According to yet another embodiment, the central controller 170 may be removed and the functions of the central controller 170 incorporated into the segment controllers 51, the industrial controller 200, or a combination thereof, and each segment controller 51 may communicate directly with the industrial controller 200.

The industrial controller 200 may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the other controllers 51, 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 or to the respective segment controllers 51 where the receiving controller operates to generate commands for the current required in each coil 50 of the corresponding segment controller 51 to control motion of each mover 100. Optionally, the industrial controller 200 may include a module in one of the slots of the chassis or embedded as a routine executing within the processor module 208 to perform a portion of the command generation and the processor module 208 may transmit a current command to a segment controller rather than a desired location.

Figure 10:
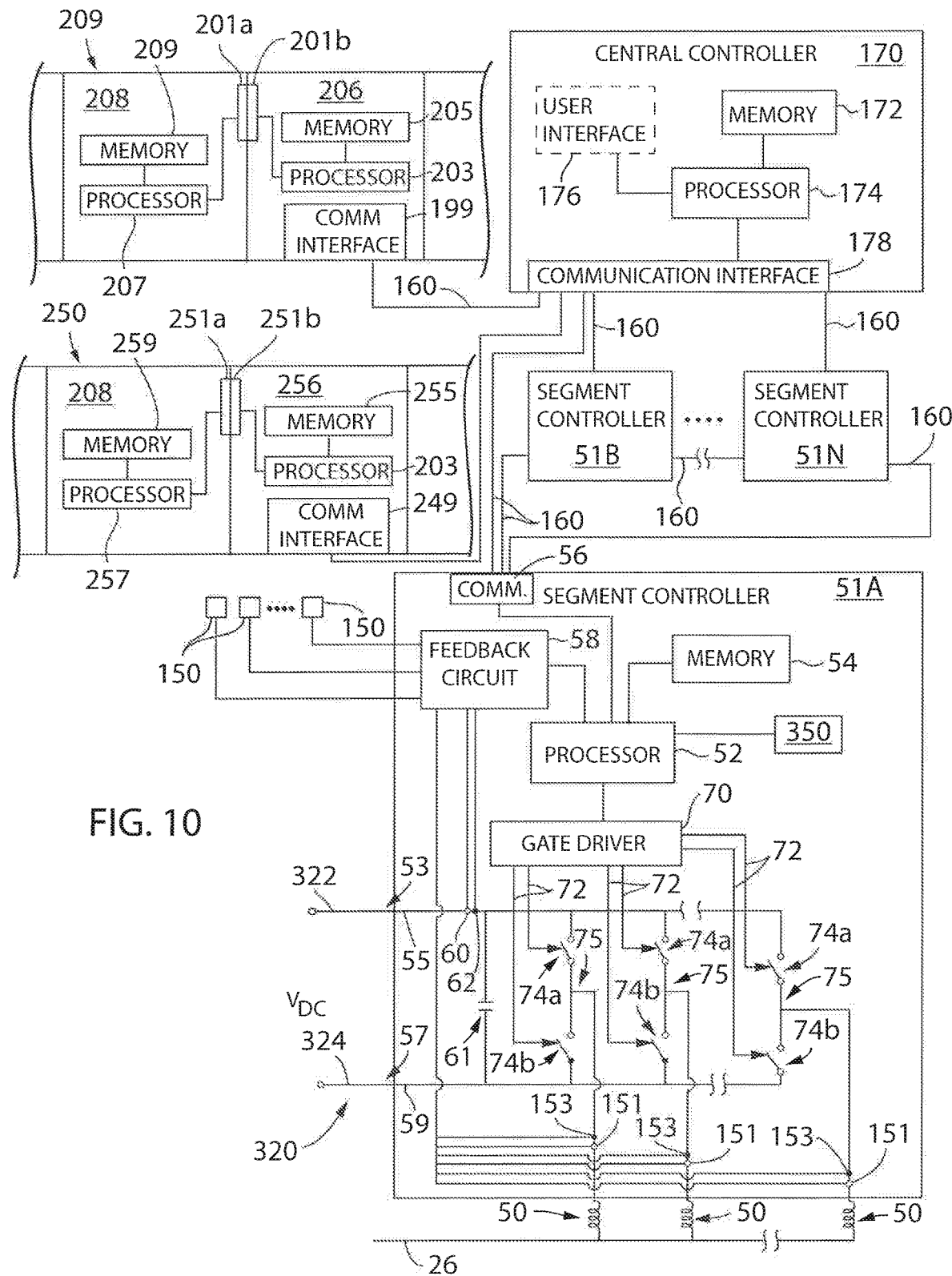
FIG. 10 is a block diagram representation of the control system of FIG. 9.

With reference also to FIG. 10, each module in the industrial controller 200 may include its own memory and processor and be configured to execute one or more routines corresponding to the desired operation of the respective module. The portion of the industrial controller illustrated in FIG. 10, shows a first processor 207 and a first memory device 209 located in the processor module 208 and a second processor 203 and a second memory 205 located in the communication module 206. A backplane connects each module within the industrial controller 200 and backplane connectors 201a, 201b are shown connecting the two modules. Although illustrated as directly connecting the two modules, the backplane is a communication bus extending along the chassis of the industrial controller and each backplane connector 201 for a module engages a complementary backplane connector on the communication bus aligned with the slot on the chassis in which the module is inserted. A communication interface 199 within the communication module 206 is configured to connect to the industrial network 160.

The central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 51 on each track segment via a network medium 160. The central controller 170 may transfer a command signal to the segment controller 51 in each track segment to control energization of the coils 50. The central controller 170 may receive feedback signals corresponding to the identification and/or location of movers 100 along each track segment and control motion of the movers 100 directly from the central controller 170. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

In another aspect, known as "distributed" control, the central controller 170 may be configured to transfer the desired motion commands, or a portion thereof, from the central controller 170 to each of the segment controllers 51. The motion commands identify one or more desired movers 100 to be positioned at or moved along each track segment 312. The central controller 170 may distribute motion commands to each segment controller 51 according to the mover 100 located at or proximate to the track segment 312. The corresponding segment controller 51 for each track segment 312 may, in turn, determine the appropriate command signals for each mover 100 and transmit the command signals to one or more power segments in each track segment to control energisation of the coils 50. Distributed control can minimize the amount of communication in the system by allowing segment controllers 51, rather than the central controller 170, to control driving each mover 100 along the track 310. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

A position feedback system provides knowledge of the location of each mover 100 along the length of the track segment 12, 14 to the segment controller 51. In one embodiment, the position feedback system can include one or more position magnets 130 mounted to the mover 100 and an array of sensors 150 spaced along the track segment 12, 14. With reference again to FIG. 1, for convenience, only a few position sensors 150 are illustrated along one track segment 12. It is contemplated that the position sensors 150 would continue along each track segment 12, 14 and for the entire length of the track 10. The sensors 150 are positioned such that each of the position magnets 130 are proximate to the sensor as the mover 100 passes each sensor 150. The sensors 150 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 150 outputs a feedback signal provided to the segment controller 51 for the corresponding track segment 12 on which the sensor 150 is mounted. The feedback signal may be an analog signal provided to a feedback circuit 58 which, in turn, provides a signal to the processor 52 which corresponds to the magnet 130 passing the sensor 150.

The segment controller 51 also includes a communication interface 56 that receives communications from the central controller 170, from adjacent segment controllers 51 in a path, and the industrial controller 200. The communication interface 56 extracts data from the message packets on the communication network and passes the data to a processor 52 executing in the segment controller 51. The processor may be a microprocessor. Optionally, the processor 52 and/or a memory device 54 within the segment controller 51 may be integrated on a field programmable array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 51 receives the motion profile or desired motion of the movers 100 and utilizes the motion commands to control movers 100 along the track segment 312 controlled by that segment controller 51.

Each segment controller 51 generates switching signals to generate a desired current and/or voltage at each coil 50 in the track segment 312 to achieve the desired motion of the movers 100. The switching signals 72 control operation of switching devices 74 for the segment controller 51. According to the illustrated embodiment, the segment controller 51 includes a dedicated gate driver module 70 which receives command signals from the processor 52, such as a desired voltage and/or current to be generated in each coil 50 and generates switching signals 72. Optionally, the processor 52 may incorporate the functions of the gate driver module 70 and directly generate the switching signals 72. The switching signals 72 are provided to the power conversion segment in each track segment 312, where each power conversion segment includes multiple power switching devices 74. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 50 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 322. The segment controller 51 also receives feedback signals corresponding to the operation of coils 50 connected to the power segment. A voltage sensor 153 and a current sensor 151 are connected in series with the coils 50 at each output of the power section. The voltage sensor 153 generates a voltage feedback signal and the current sensor 151 generates a current feedback signal, where each feedback signal corresponds to the operating condition of the corresponding coil 50. The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 50. The energized coils 50 create an electromagnetic field that interacts with the drive magnets 140 on each mover 100 to control motion of the movers 100 along the track segment 12.

Figure 11:
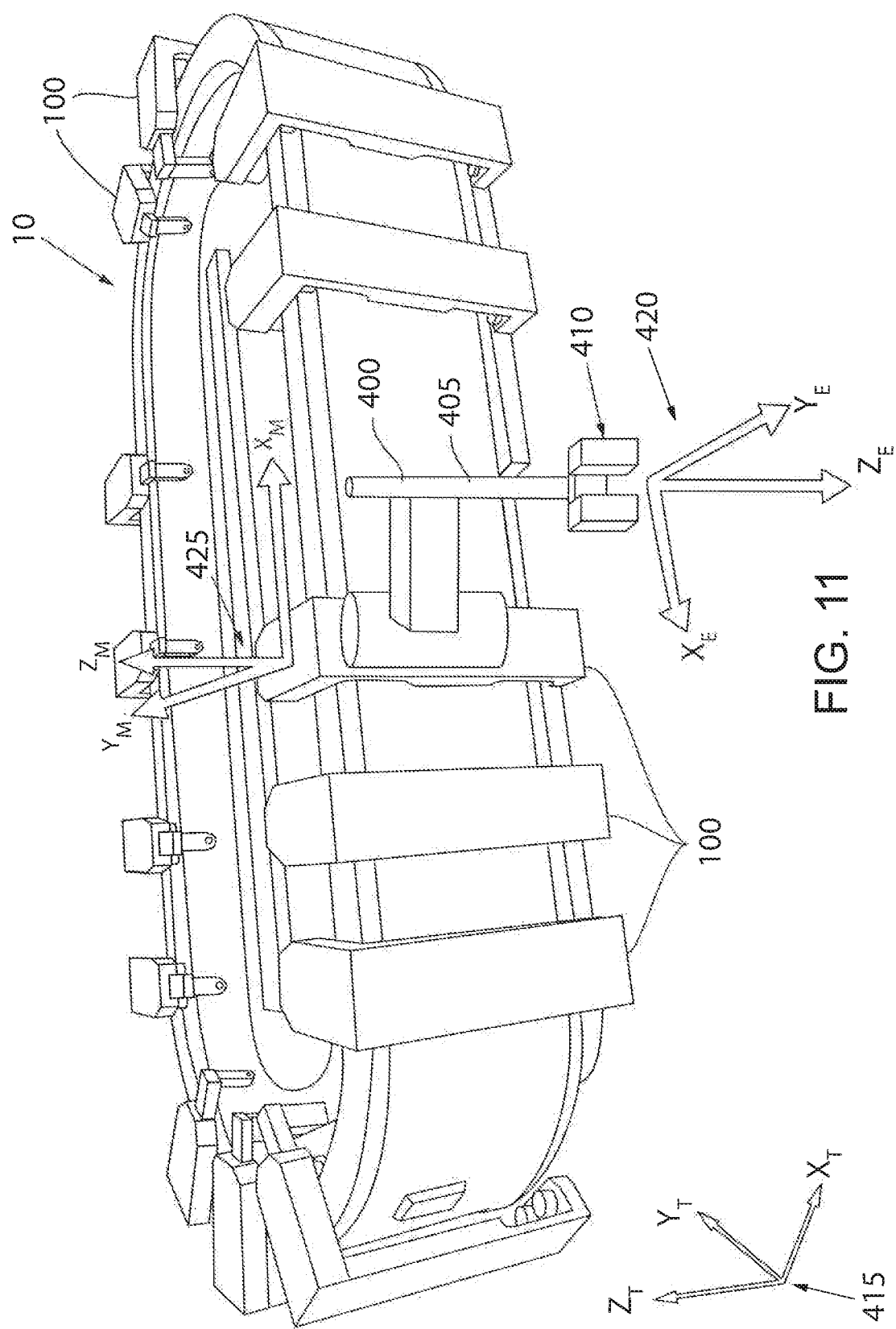
FIG. 11 is a perspective view of another exemplary linear cart system with an actuator mounted on one of the movers in the linear cart system.

Turning next to FIG. 11, another embodiment of the transport system is illustrated. In this embodiment, an actuator 400 is mounted on a mover 100. For ease of illustration, a single actuator 400 is illustrated. Optionally, each mover 100 may include an actuator. The illustrated actuator 400 may be configured to pivot about its mount to the mover 100, raise and lower an arm 405 on the actuator 400, and/or open and close an end effector 410 in the form of a clamp mechanism. If each mover 100 includes a similar actuator 400, it is contemplated, for example, that an automated assembly process may be configured to selectively assemble a product where each product may include a number of options. Each mover 100 may pick up a part or sub-assembly from a station adjacent to the track 10 as the movers 100 travel around the track according to a desired set of options to be included on the product. The movers 100 may place the parts or subassemblies on the product at an assembly station as the movers 100 travel past the assembly station. When a part is finished, one mover 100 may be configured to move the finished part from the assembly station to another station for packaging or other subsequent operation. Optionally, the assembly station may include a conveyor system to move a completed part away and insert a new blank part for assembly. In this manner, the transport system may be utilized to automatically manufacture small amounts of highly customizable parts without requiring operator intervention during switchover between parts.

In the illustrated embodiment, a first coordinate system 415 is defined as a set of track axes. These track axes 415 define an X-axis, $X_T$, a Y-axis, $Y_T$, and a Z-axis, $Z_T$, for the track 10. It is contemplated that stations adjacent to the track may include positions defined based on the track axes 415. The origin of the track axes 415 may be placed at any suitable location according to the application requirements. According to the illustrated embodiment, the origin of the track axes 415 is positioned to one end, off to one side, and below the track 10 such that all motion of movers 100 along the track 10 occurs in a positive quadrant of each pair of axes. Optionally, individual stations may include a separate set of axes corresponding to that station.

Figure 12:
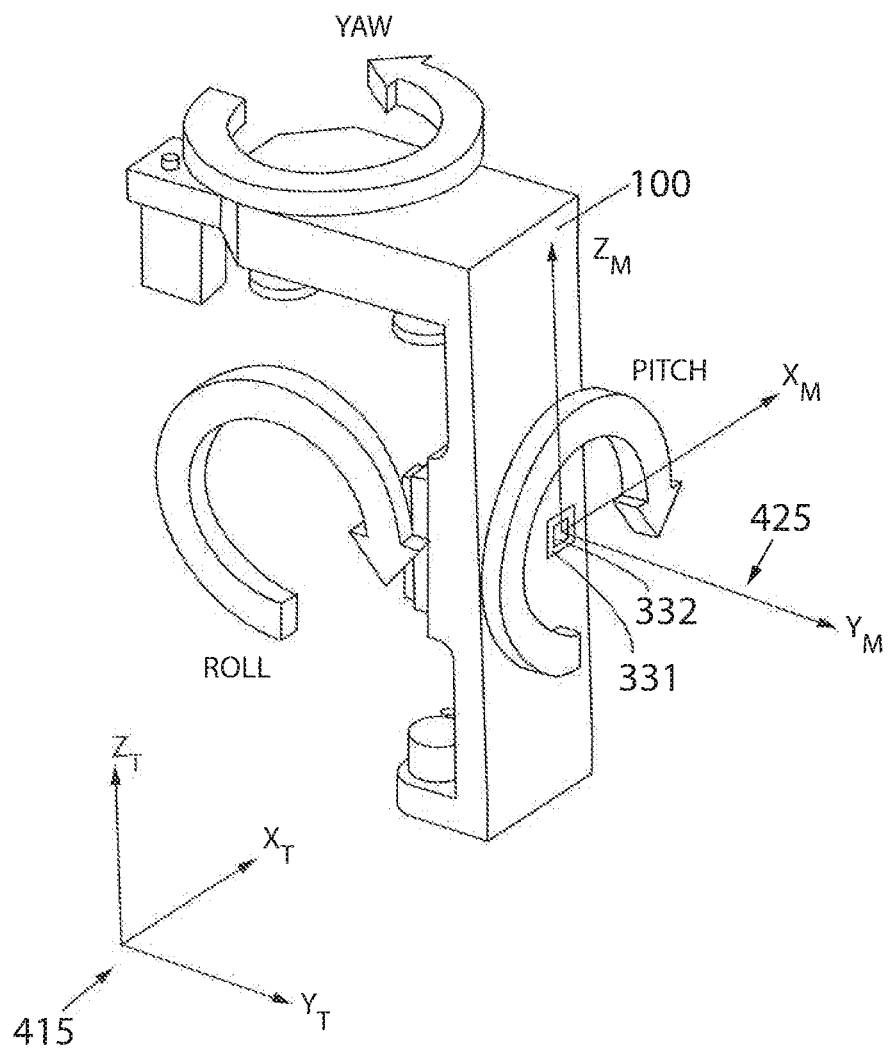
FIG. 12 is a perspective view of one of the movers of FIG. 11 illustrating a coordinate system associated with the mover.

A second coordinate system 425 is defined as a set of mover axes. The mover axes 425 define an X-axis, $X_M$, a Y-axis, $Y_M$, and a Z-axis, $Z_M$, for the mover 100. The origin of the mover axes 425 may be positioned at any desired location with respect to the mover 100. As illustrated in FIG. 11, the origin of the mover axes 425 is defined on the top of the mover. As illustrated in FIG. 12, the origin of the mover axes 425 is defined along the side member of the mover. Because the origin of the mover axes 425 is defined with respect to the mover 100, the origin will similarly change position in the first coordinate system 415 as the mover 100 travels along the track 10.

A third coordinate system 420 is defined as a set of end effector axes. The end effector axes 420 define an X-axis, $X_E$, a Y-axis, $Y_E$, and a Z-axis, $Z_E$, for the end effector 410 on the actuator 400. The origin of the end effector axes 420 may be positioned at any desired location with respect to the end effector. According to one embodiment, it is contemplated that the origin of the end effector axes 420 is located at the desired point of interaction with the end effector 410. As a result, a variation in orientation of a mover 100 along the track will shift the origin accordingly. Because the origin of the end effector axes 420 is defined with respect to the end the origin will change position in the first coordinate system 415 as the mover 100 travels along the track 10.

Figure 13:
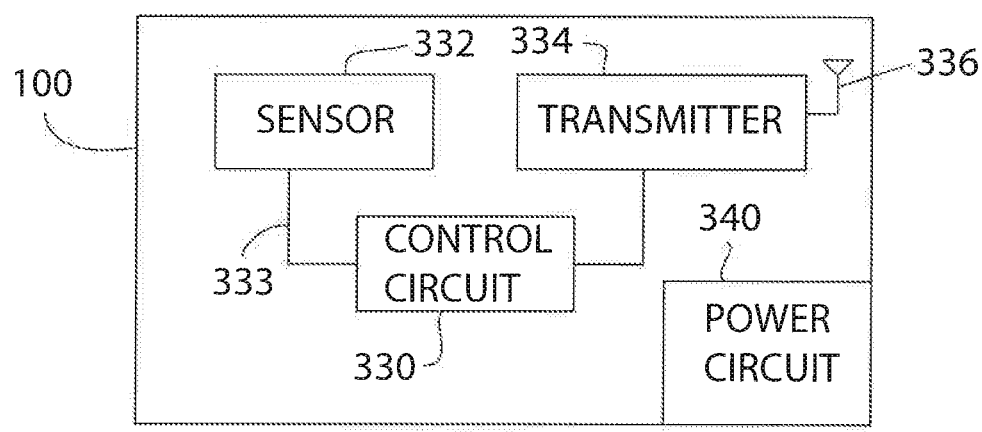
FIG. 13 is a block diagram representation of electronic components mounted on one of the movers of the linear cart system of FIG. 1 according to one embodiment of the invention.

In operation, the orientation of the mover 100 or the orientation of an actuator 400 on the mover may be used to control operation of the mover 100, to control operation of the actuator 400, or to control operation of an actuator mounted external to the mover. A sensor 332 (see FIGS. 12-13) mounted on the mover 100 may generate feedback signals 333 corresponding to the orientation of the mover 100 at the location at which the sensor is mounted. The feedback signals 333 are transmitted to a controller located remote from the mover 100. The controller may be the segment controller 51 controlling the section of track on which the mover is located. Optionally, the controller may be the central controller 170 for the independent cart system or the industrial controller 200 controlling operation of the track and external actuators. It is further contemplated that a dedicated receiver 350 or multiple receivers may be positioned around the track 10 to receive the feedback signals 333 from each mover and the dedicated receiver 350 may relay the information to one of the controllers. The orientation information may be utilized to modify a motion command provided to the mover 100 or to the actuator 400 mounted on a mover.

As shown in FIG. 12, it is contemplated that the sensor 332 may be mounted on a printed circuit board 331 at the origin of the mover axes 425. Optionally, the sensor 332 and/or the printed circuit board 331 may be mounted at any convenient location on the mover 100. The origin of the mover axes 425 may follow the sensor 332 and be located at the sensor or, optionally, the origin of the mover axes 425 may be at a fixed location with respect to the mover, and an offset between the sensor 332 location and the origin of the mover axes 425 may be stored in the control circuit 330 mounted on the mover 100.

According to one embodiment of the invention, the sensor 332 is a three-axis device, configured to generate three feedback signals, where each feedback signal corresponds to one of the axes. The sensor 332 may include three accelerometers or three gyroscopes packaged within the device. A first accelerometer/gyroscope generates a first feedback signal corresponding to an angle of the sensor with respect to the x-axis, a second accelerometer/gyroscope generates a second feedback signal corresponding to an angle of the sensor with respect to the y-axis, and a third accelerometer/gyroscope generates a third feedback signal corresponding to an angle of the sensor with respect to the z-axis. With reference to FIG. 12, the feedback signal corresponding the x-axis may be used to determine roll of the mover 100, the feedback signal corresponding the y-axis may be used to determine pitch of the mover, and the feedback signal corresponding the z-axis may be used to determine yaw of the mover. The roll, pitch, and yaw may be determined according to equations 1-3 presented below.

$$\text{Roll } (\varphi) = \begin{bmatrix} 1 & 0 & 0 \\ 0 & \cos\varphi & -\sin\varphi \\ 0 & \sin\varphi & \cos\varphi \end{bmatrix} \quad (1)$$

where, $\varphi$ is the angle output from the accelerometer/gyroscope with respect to the x-axis.

$$\text{Pitch } (\theta) = \begin{bmatrix} \cos\theta & 0 & \sin\theta \\ 0 & 1 & 0 \\ -\sin\theta & 0 & \cos\theta \end{bmatrix} \quad (2)$$

where, $\theta$ is the angle output from the accelerometer/gyroscope with respect to the y-axis.

$$\text{Yaw } (\phi) = \begin{bmatrix} \cos\phi & -\sin\phi & 0 \\ \sin\phi & \cos\phi & 0 \\ 0 & 0 & 1 \end{bmatrix} \quad (3)$$

where, $\phi$ is the angle output from the accelerometer/gyroscope with respect to the z-axis.

According to another embodiment of the invention, the sensor 332 is a nine-axis device, configured to generate nine feedback signals, where each feedback signal corresponds to one of the three axes of the coordinate system. The sensor 332 may include a multi-axis accelerometer, a multi-axis gyroscope, and a multi-axis compass packaged within the device. Each sensor generates three separate feedback signals, where the separate feedback signals from each sensor corresponds to one of the physical axes within the coordinate system. Each feedback signal is considered an axis from the sensor, thereby generating nine total axes of feedback signals. The feedback signals may be used to determine the roll, pitch, and yaw as discussed above.

With reference again to FIG. 13, the feedback signals 333 from each sensor 332 may be provided to a control circuit 330 mounted on the mover 100. The control circuit 330 may include a processor and a memory device, where the memory device is configured to store instructions executable by the processor. The processor and memory device may be separate devices or integrated, for example, onto a single application specific integrated circuit (ASIC) or field programmable gate array (FPG) device. The control circuit 330 may also include analog-to-digital (A/D) converters, digital-to-analog (D/A) converters, logic devices, amplifiers, buffers, and the like according to the application requirements. The control circuit 330 includes necessary components to receive the feedback signals 333 from the sensor 332 and transfer the feedback signals to a transmitter 334. The control circuit 330 may also be configured to execute instructions or perform analog processing of the feedback signals 333 to perform some initial processing of the feedback signals.

As indicated above, the feedback signals 333 from the sensor are provided to the control circuit 330. The control circuit 330 may be configured to pass the feedback signals on directly to a controller located remotely from the mover 100. Optionally, the control circuit 330 may be configured to execute one or more of equations 1-3 above to determine the roll, pitch, and/or yaw of the mover 100. The roll, pitch, and/or yaw may be provided to the controller located remotely from the mover 100 as the orientation of the mover 100. In some applications, the sensor 332 may be configured to internally process the signals corresponding to particular axes of motion and generate the roll, pitch, and/or yaw as a feedback signal. The feedback signals 333 provided to the control circuit 330 and subsequently transmitted from the mover 100 to the controller describe an orientation of the mover, or a particular point on the mover, with respect to a coordinate system whether the signals are positional (e.g., x, y, and z-axis) or rotational (e.g., roll, pitch, and yaw).

With reference again to FIG. 13, the mover 100 includes a transmitter 334 and antenna 336 mounted on the mover to transmit the data from the sensor 332 to a controller located remotely from the mover 100. The control circuit 330, the transmitter 334, or a combination thereof, insert a value of the feedback signal 333 or of a processed signal into a data packet for transmission. One or more receivers 350 (see also FIGS. 9-10), may be positioned along the track 10. In some applications, a single receiver 350 may have sufficient range and bandwidth to communicate with each mover 100 traveling along the track 10. In other applications, the number of movers 100 may generate a volume of data packets that exceed the bandwidth of a single receiver 350 or the distance of travel along the track 10 may exceed the range of the receiver. As illustrated in FIG. 9, each segment controller 51 may include or have a receiver 350 connected to the segment controller 51. The transmitter 334 transmits data packets with the value corresponding to the physical orientation of the mover to a receiver 350 of the segment controller 51 in closest proximity to the mover. The receiver 350, in turn, transmits the data to the segment controller 51 or to a central controller 170 or industrial controller 200 in communication with the segment controller 51.

The mover 100 also includes a power circuit 340 mounted on the mover 100. The power circuit 340 is configured to supply power to the sensor 332, control circuit 330, and transmitter 334. According to one embodiment of the invention, the power circuit 340 may include a battery configured to supply power. One or more voltage regulators receive power from the battery and supply a regulated DC voltage, for example, at 3.3 VDC, 5VDC, 12 VDC, 24 VDC, any other required DC or AC voltage, or a combination thereof. Optionally, the mover 100 includes a pickup device configured to travel along with the mover and to receive power transmitted from a power source external to the mover. The power source may be, for example, a supply coil or supply rail which receives a current that generates an electromagnetic field. The pickup device may be a coil mounted on the mover in which a secondary current is induced as the mover travels through the electromagnetic field. The secondary current is supplied to a voltage regulator circuit to provide the required voltages to each of the devices on the mover or to an energy storage device to store excess energy not required by the devices. If more power is required than may be provided from the pick-up device, energy stored in the energy storage device may supplement the energy supplied from the pick-up coil.

As discussed above, motion commands are generated in one of the controllers for each mover 100 along the track. The industrial controller 200, a central controller 170, the segment controller 51, or a combination thereof, generates a desired motion profile for each mover 100. Each segment controller 51 regulates the voltage supplied to the coils 50 along the corresponding track segment to achieve desired operation of a mover located along the track segment. The desired motion profile defines a position along the track at which the mover 100 is located at a particular instance in time.

An actuator 400 on the mover 100 may be configured to interact with a product or fixture located remote from the mover. Optionally, an actuator adjacent to the track and remote from the mover may be configured to interact with the mover 100 or with a load or fixture mounted on the mover 100 as the mover travels along the track. The interactions between the mover 100 and a device located remotely from the mover may require precise positioning. For example, a suction device may establish a vacuum or a fluid connection may be established between two couplings. Vibration of the mover 100 as it travels along the track may cause a deviation from an expected orientation of the mover 100 and an actual orientation of the mover which may break, or cause a leak in, such a connection. Thus, it would be desirable for the controller generating the motion profile to receive the data packets with the values corresponding to the physical orientation of the mover as it travels along the track in order to compensate for any deviation of the mover 100 in orientation from the expected orientation.

The controller generating the motion profile may receive a position matrix, P, including the X, Y, and Z axes coordinates of a defined position on the mover 100 as the mover travels along the track. The controller may also receive a rotational matrix, R, including the angle measurements corresponding to the roll, yaw, and pitch of the defined position as well. The coordinates and/or the rotational matrix are defined in a first coordinate system, such as the mover axes 425 or the end effector axes 420. The controller translates the position and/or rotational information into a fixed coordinate system, such as the track axes 415, in which the motion commands are being generated. The controller determines a deviation of the measured orientation of the position on the mover from an expected orientation and determines an offset value corresponding to this deviation. The controller may then modify one of the original motion commands, for example, by adding the deviation as an offset value to dynamically compensate operation of the mover 100 or of the actuator located remote from the mover with which the mover is intended to interact. For example, the controller may slow down or increase speed of the mover to ensure the mover is at a desired location along the track. The controller may cause the actuator to extend further or retract slightly to compensate for side-to-side vibrations in the mover 100. Similarly, the controller may generate multi-axis offset values for a robotic arm to adjust an angle of interaction with the mover 100 due to variations in roll, pitch, or yaw of the mover 100. The controller will, therefore, be able to track the desired pose of the mover by compensating for deviation of the measured orientation of the position on the mover from an expected orientation.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for real-time determination of orientation for a physical location on a mover in an independent cart system, the system comprising:
   a track having a plurality of track segments;
   a mover mounted on and configured to travel along the track in a two-dimensional coordinate system;
   a sensor mounted on the mover, wherein the sensor is configured to generate at least one feedback signal corresponding to a physical orientation of the mover in a coordinate system, wherein an origin of the coordinate system travels with the mover;
   a control circuit mounted on the mover, wherein the control circuit is configured to receive the at least one feedback signal and to generate a data packet including a value of the at least one feedback signal corresponding to the physical orientation of the mover;
   a transmitter mounted on the mover, wherein the transmitter is configured to receive the data packet from the control circuit and to transmit the data packet to a receiver located external from the mover; and
   a controller located remotely from the mover, wherein the controller is configured to:
   communicate with and to receive the data packet from the receiver,
   determine at least one rotational position of the mover as a function of the value of the at least one feedback signal in the data packet, wherein the rotational position of the mover includes rotation in a third dimension, the third dimension perpendicular to the two-dimensional coordinate system; and
   control operation of either the mover or an actuator, configured to interact with the mover, in real-time responsive to the at least one rotational position of the mover.

2. The system of claim 1 wherein the controller is further configured to:
   define a second coordinate system external from the mover; and
   determine the physical orientation of the mover in either the coordinate system travelling with the mover or the second coordinate system as a function of the value of the at least one feedback signal in the data packet.

3. The system of claim 2 wherein:
   the actuator is mounted on the mover, and
   the controller is further configured to modify operation of the mover or of the actuator responsive to determining the physical orientation of the mover.

4. The system of claim 2 wherein:
   the actuator is mounted at a location remote from the mover, and
   the controller is further configured to modify operation of the actuator responsive to determining the physical orientation of the mover.

5. The system of claim 1 wherein the control circuit is further configured to insert the value of the at least one feedback signal in the data packet.

6. The system of claim 1 wherein:
   the control circuit is further configured to:
      determine the at least one rotational position of the mover as a function of the at least one feedback signal, and
      insert the a value of the at least one rotational position of the mover in the data packet; and
   the controller is further configured to determine the at least one rotational position of the mover by reading the value of the at least one rotational position of the mover from the data packet.

7. The system of claim 1 wherein the actuator is mounted on the mover, the system further comprising an end effector operatively mounted to the actuator, wherein:
   the sensor is configured to generate the at least one feedback signal corresponding to a physical orientation of the end effector, and
   the control circuit is configured to receive the at least one feedback signal and to generate a data packet including a value corresponding to the physical orientation of the end effector.

8. The system of claim 1 further comprising:
   a battery mounted on the mover, wherein the battery is configured to provide power for the sensor, the control circuit, and the transmitter; and
   at least one voltage regulator circuit mounted on the mover and configured to transfer power from the battery to the sensor, the control circuit, and the transmitter.

9. The system of claim 1 further comprising:
   at least one power pickup device mounted on the mover, wherein the power pickup device is configured to travel with the mover and to receive power transmitted from a stationary power source mounted along a track of the independent cart system; and
   at least one voltage regulator circuit mounted on the mover and configured to transfer power from the power pickup device to the sensor, the control circuit, and the transmitter.

10. A method for real-time determination of orientation at a physical location on a mover operative to travel along a track in a two-dimensional coordinate system for an independent cart system, the method comprising the steps of:
   generating at least one feedback signal corresponding to a physical orientation of a location on the mover in a coordinate system with a sensor mounted on the mover, wherein an origin of the coordinate system travels with the mover;
   receiving the at least one feedback signal at a control circuit mounted on the mover;
   generating a data packet including a value of the at least one feedback signal corresponding to the physical orientation of the mover with the control circuit;
   transmitting the data packet from the mover with a transmitter mounted on the mover to a receiver mounted external from the mover;
   receiving the data packet at a controller located remotely from the mover;
   determining at least one rotational position of the mover as a function of the at least one feedback signal, wherein the rotational position of the mover includes rotation in a third dimension, the third dimension perpendicular to the two-dimensional coordinate system; and controlling operation of either an actuator configured to interact with the mover or the mover in real-time responsive to the at least one rotational position of the mover.

11. The method of claim 10 wherein:
a second coordinate system is defined external from the mover, the method further comprising the step of determining an orientation of the physical location on the mover in either the coordinate system travelling with the mover or the second coordinate system with the controller as a function of the value of the at least one feedback signal in the data packet.

12. The method of claim 11, wherein:
the actuator is mounted on the mover, and
the controller controls operation of either the actuator or the mover responsive to determining the orientation of the physical location on the mover.

13. The method of claim 11, wherein:
the actuator is mounted at a location remote from the mover, and
the controller controls operation of the actuator responsive to determining the orientation of the physical location on the mover.

14. The method of claim 10 wherein the step of generating the data packet including the value of the at least one feedback signal corresponding to the physical orientation of the mover with the control circuit includes inserting the value of the at least one feedback signal in the data packet.

15. The method of claim 10 wherein:
the at least one rotational position of the mover is determined with the control circuit mounted on the mover, and the step of generating the data packet including the value corresponding to the physical orientation of the mover with the control circuit includes inserting the at least one rotational position of the mover in the data packet.

16. The method of claim 10 wherein:
the actuator is mounted on the mover,
an end effector is operatively mounted to the actuator,
the step of generating the at least one feedback signal generates at least one feedback signal corresponding to a physical orientation of the end effector, and
the step of generating the data packet includes a value corresponding to the physical orientation of the end effector.

17. The method of claim 10 further comprising the steps of:
providing power for the sensor, control circuit, and the transmitter with a battery mounted on the mover; and
transferring power from the battery to the sensor, the control circuit, and the transmitter with at least one voltage regulator circuit mounted on the mover.

18. The method of claim 10 further comprising the steps of:
receiving power transmitted from a stationary power source mounted along a track of the independent cart system with at least one power pickup device mounted on the mover, wherein the power pickup device is configured to travel with the mover; and
transferring power from the power pickup device to the sensor, the control circuit, and the transmitter with at least one voltage regulator circuit mounted on the mover.

* * * * *